United States Patent [19]

Dickey

[11] 3,776,577

[45] Dec. 4, 1973

[54] FLOW CONDUCTOR COUPLING

[76] Inventor: Weldon G. Dickey, 103 N. Kaufman, Seagoville, Tex.

[22] Filed: Nov. 9, 1971

[21] Appl. No.: 197,026

[52] U.S. Cl. .................... 285/31, 285/156, 285/169, 285/355, 285/356
[51] Int. Cl. ........................................... F16l 19/06
[58] Field of Search .................. 285/32, 31, 169, 285/356, 332.2, 355, 332.3

[56] References Cited
UNITED STATES PATENTS

| | | | |
|---|---|---|---|
| 2,989,323 | 6/1961 | Bass | 285/32 |
| 2,937,889 | 5/1960 | Palmese | 285/31 |
| 2,695,794 | 11/1954 | Davis et al. | 285/31 |
| 2,385,156 | 9/1945 | Newell | 285/356 X |
| 2,495,532 | 1/1950 | Leonard | 285/169 |
| 1,997,845 | 4/1935 | Adams | 285/169 |
| 696,106 | 3/1902 | Osborne | 285/355 X |

FOREIGN PATENTS OR APPLICATIONS

| | | | |
|---|---|---|---|
| 583,865 | 10/1958 | Italy | 285/31 |
| 1,215,424 | 11/1959 | France | 285/332.3 |

*Primary Examiner*—Thomas F. Callaghan
*Attorney*—Walter J. Jagmin

[57] ABSTRACT

A coupling for connecting adjacent spaced ends of two flow conductors, such as pipes or tubes, which automatically adjusts for variations in the spacing between the two ends and is installable on the two flow conductors without requiring displacement of either flow conductor during such installation or the threading or other adaptation of the two ends.

6 Claims, 5 Drawing Figures

INVENTOR
Weldon G. Dickey

BY *Walter J. Jagar*

ATTORNEY

PATENTED DEC 4 1973 3,776,577

INVENTOR
Weldon G. Dickey

BY *Walter J Jagm*

ATTORNEY

FLOW CONDUCTOR COUPLING

This invention relates to couplings and more particularly to couplings for connecting longitudinally aligned adjacent spaced ends of two flow conductors.

In many cases, it is necessary to connect two flow conductors, such as pipes or tubes, by a coupling to form a single flow conductor and difficulty is experienced in doing so if either of the flow conductors cannot be readily moved or displaced to facilitate the installation of the couplng thereon, as where the flow conductors are buried in the earth or are very heavy, or if the space or distance between the two ends cannot be precisely predetermined to make a non-adjusting coupling fit properly between and on the flow conductors.

Accordingly, it is an object of the invention to provide a new and improved coupling for connecting two flow conductors which does not require the movement of either flow conductor during the connection of the coupling to the flow conductor.

Another object is to provide a coupling, of the type described, which is adapted to connect the ends of the two flow conductors even though the distance between ends may vary within a predetermined range.

Still another object is to provide a coupling, of the type described, having two sections and seal means for sealing between the sections and between the flow conductors, the seal means being subject to the pressure differential between the interior and exterior of the flow conductors with the force of the pressure differential tending to force the seal means into better sealing engagement with the coupling sections and the flow conductors.

An important object of the invention is to provide a coupling having a first section of somewhat larger diameter than the flow conductor whereby the first section may be telescoped on one flow conductor to allow the second coupling section to be telescoped partially over the other flow conductor, the two sections may then be threadedly connected at their inner end portions while their outer end portions extend over end portions of the two flow conductors, and seal compressing and retaining members rotatable on the flow conductors and threaded in the outer end portions of the coupling sections for compressing seal means into sealing and retaining relationships between the coupling sections and the flow conductors.

Another object is to provide a coupling, of the type described, wherein the second section has a reduced inner end portion telescoped in the first section and seal means on the reduced end portion for sealing between the coupling sections.

Additional objects and advantages of the invention will be readily apparent from the reading of the following descriptions of the device of the invention, and reference to the accompanying drawings thereof, wherein.

Figure 1:
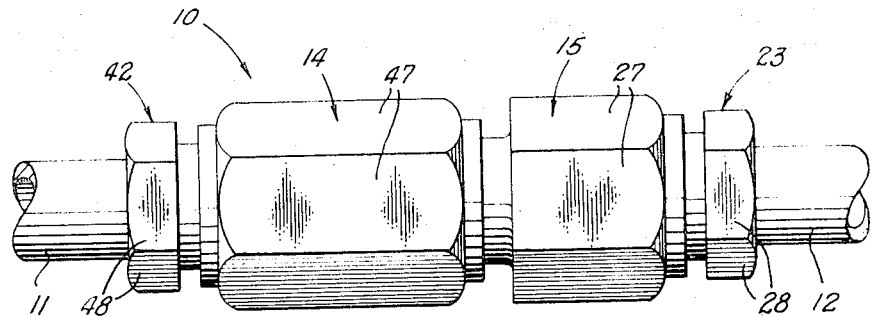
FIG. 1 is a side view of the coupling embodying the invention.
Figure 2:
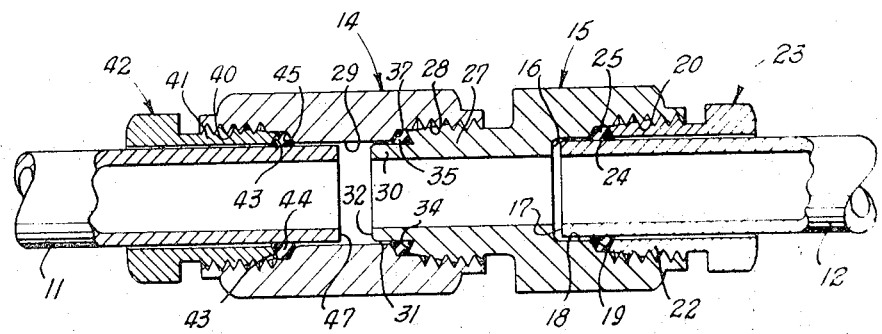
FIG. 2 is a sectional view of the coupling.
Figure 3:
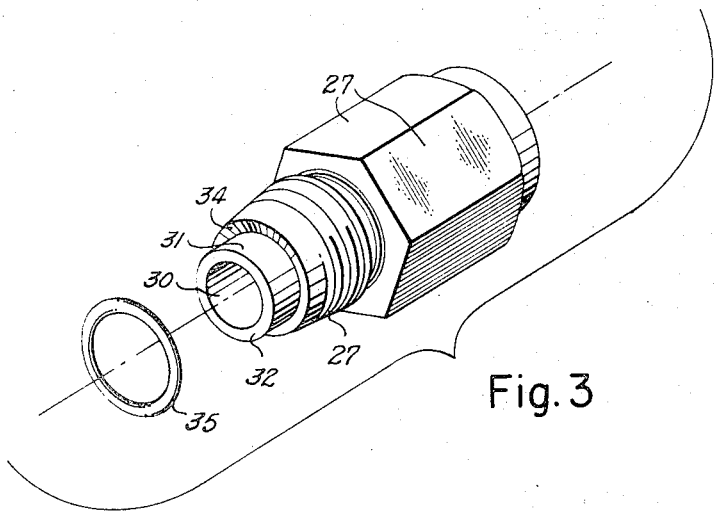
FIG. 3 is an exploded prospective view of one of the coupling sections.

Referring now to FIGS. 1, 2 and 3 of the drawings, the coupling 10 embodying the invention for connecting the spaced ends of two flow conductors, such as the pipes 11 and 12, includes a main section 14 whose internal diameter is somewhat greater than that of the pipes so that the section 14 may telescope fully over the pipe 11, and a position locator section 15 having an internal annular shoulder 16 which is adapted to engage the annular end surface 17 of the pipe 12 to limit telescopical movement of the locator section 15 on the pipe 12. The locator section has a bore portion 18 of internal diameter. slightly greater than the external diameter of the pipe 12 which extends from the shoulder 17 to the outwardly bevelled or inclined seat surface 19. The locator section at the outer enlarged portion 20 of its bore is threaded to receive the reduced threaded end portion 22 of the seal compressor and retainer member 23 of the coupling. The annular inner end seal surface 24 of the member 23 is bevelled or inclined outwardly and a seal means, such as an O-ring 25, disposed on the pipe 12 is compressed between the two seat surfaces 19 and 24 and not only seals between the member 23, the locator section 15 and the pipe 12, but also holds the locator section against movement off the pipe due to its compressed frictional engagement with the pipe.

The locator section 15 and the member 23 are provided with flat surfaces 27 and 28, respectively, to facilitate their engagement by wrenches during the installation of the coupling on the pipes.

The locator section 15 has a reduced threaded intermediate portion 27 which is received in the right hand outer enlarged threaded portion 28 of the bore 29 of the main section 14 and an inner end section 30 of reduced external diameter, which may be somewhat larger than the external diameter of the pipes 11 and 12 and which is adapted to telscope or extend into the intermediate middle portion of the bore 29 of the main section. The external annular surface 31 of the inner end portion of the locator section to the radially outwardly inclined or bevelled seat surface 34 of the locator section which is adapted to engage compressively a seal means, such as an O-ring 35 disposed on the reduced inner end portion 30. The seal means also engages the outwardly bevelled or inclined seat surface 37 of the main section which extends outwardly from one end of the bore 29. The O-ring is compressed between the surfaces 31, 34 and 37 and seals therebetween.

The bore 29 is also enlarged and threaded at its left hand outer end portion 40 and the threaded portion 41 of a seal compressor and retainer member 42 is threadably engageable therewith. The seal compressor and retainer member 42 may be identical in structure to the member 23 with its inner end seal surface 43 being bevelled outwardly to engage a seal means, such as the O-ring 44, and hold it in compressed engagement with the outwardly inclined or bevelled seat surface 45 of the main coupling section 14.

The main section and the member 42 are provided with flats 47 and 48 engageable by wrenches or the like to facilitate the installations of the coupling on the pipes.

The seal means 44 is not only compressed by the member 42 as it is threaded into the left end of the bore of the main section 14, against the seal surface 45, but is also moved into compressed fricational engagement with the outer surface with the pipe 11 so that the coupling is held against movement on the pipes 11 and 12 by the fricational engagement of the seal means 25 and 44 with the pipes.

It will be noted that while the overall length of the main section 14 may be somewhat longer than the distance between the adjacent facing annular end surfaces 17 and 47 of the pipes 12 and 11, respectively, the length of the intermediate portion of the bore 29 of the main section is of smaller length than the distance between the end surfaces 17 and 47.

In use, when it is desired to connect the pipes 11 and 12, the seal compressor and retainer member 42 is first telescoped onto the pipe 42, then the seal means 44 and finally the main section 14. Even though the length of the main section may be greater than the distance between the ends of the two pipes, since the outer end portions of the bore 29 are considerably greater in diameter than the external diameter of the pipe, the main section may have one end telescoped over the pipe 11 while at an angle thereto to clear its other end of the other pipe and then be pivoted into longitudinal alignment with the pipe 11 and slid thereon. The main section 14 is telescoped to the left on the pipe until its right hand end is disposed inwardly of the end surface 47 of the pipe 11. The compressor and retainer member 23 is then telescoped to the right onto the pipe 12 and then the seal means or O-ring 25. The locator section 15 of the coupling is then telescoped on the pipe 12, the enlarged outer end portion 20 of the bore 29 permitting the section 15 to be pivoted to permit telescoping of the right end portion of the section on the pipe 12 to enable its inner or left end to clear the pipe 11.

The locator 15 is then slid over the pipe 12 until its telescopical movement to the right on the pipe 12 is stopped by the engagement of its stop shoulder 16 with the end surface 17 of the pipe 12. The retainer member 23 is then threaded into the enlarged outer end portion 20 of the bore of the locator member until the seal means 25 is compressed between the seal surfaces 19 and 24 and against the outer surface of the pipe 12. The frictional engagement of the O-ring with these surfaces now holds the locator against both rotational and longitudinal movement on the pipe 12.

The main section 14 is then slid to the right and threaded on the intermediate portion 27 of the section 15, the O-ring 35 being compressed into sealing engagement with the seal surface 37 of the main section 14 and the surfaces 34 and 31 of the locator section 15.

Finally the seal compressor and retainer member 42 is slid to the right on the pipe 11 and its threaded portion 41 threaded into the enlarged portion 40 of the bore 29 of the main section and the O-ring 44 compressed into sealing engagement with the seat surfaces 43 and 45 of the member 23 and the main section 14, respectively, and with the external surface of the pipe 11.

It will be apparent that the length of the bore 29 determines the range of spacing between the pipe ends which the coupling can accommodate or span. If the spacing is relatively small, the end surface 47 of the pipe 11 will be very close to the end surface 32 of the locator section 15, and if the spacing is relatively great, the end surface 47 of the pipe 11 will be spaced further to the left from the end surface 32 of the section 15.

It will be apparent that the main section 14 may be provided in several lengths to enable the operator to connect pipes spaced apart within different ranges of distances. If the length of an available main section is too small to enable the coupling to connect pipes spaced apart a relatively great distance, a second locator section may be connected to the first locator section 15 and then the main section 14 would be connected to the such second locator section.

Figure 4:
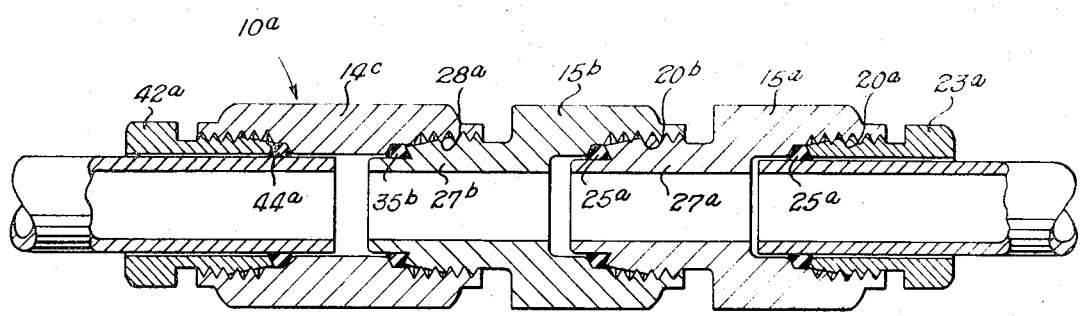
FIG. 4 is a sectional view showing a modified form of the coupling.

Referring now particularly to FIG. 4 of the drawings, the coupling 10a is similar to the coupling 10 and, accordingly, its elements have been provided wih the same reference numerals, to which the subscript "a" has been added, as the corresponding elements of the coupling 10.

The coupling 10a differs from the coupling 10 only in that an additional locator section 15b, identical to the locator section 15a, is interposed between the main section 14a and the locator section 15. It will be apparent that the additional section 15b is employed where the distance between the ends of the pipes 11 and 12 is so great that a two section coupling will not be of sufficient length. The intermediate portions 27a of the locator section 15a is threaded in the enlarged portion 20b of the locator section 15b and the intermediate section 27b of the locator section 15b is threaded in the enlarged outer end portion of the mains section 14c.

Figure 5:
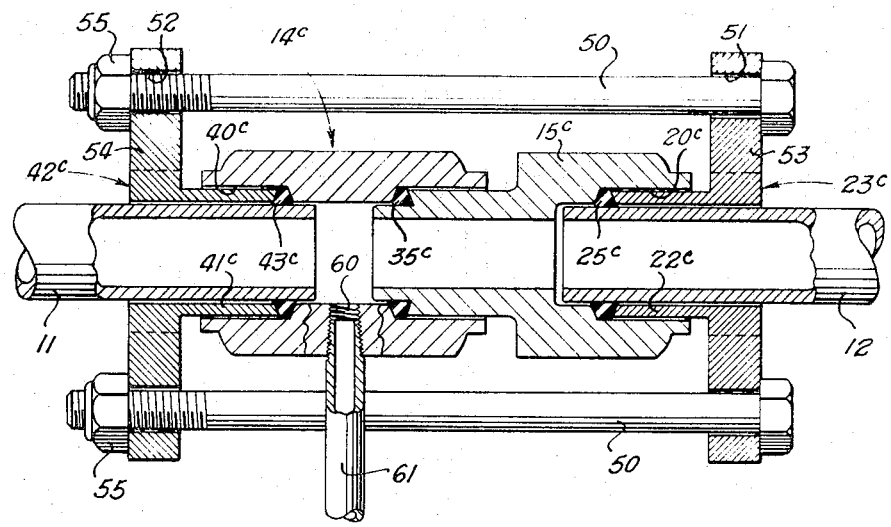
FIG. 5 is a sectional view of another modified form of the coupling.

Referring now to FIG. 5 of the drawings, the coupling 10c embodying this invention being similar to coupling 10, its elements have been provided with the same reference numerals, to which the subscript "c" has been added, as the corresponding elements of the coupling 10. The coupling 10c differs from the coupling 10 in that its sections and seal compressor and retainer members are not threadable connected to one another. Instead, these elements are rigidly secured to one another by two or more bolts 50 which extend through bolt apertures 51 and 52 in the flanges 53 and 54, respectively, of the members 23c and 42c. The bolts of course have threaded end portions on which nuts 55 are threaded.

The portions 22c and 41c of the members 23c and 42c, respectively, are slid into the enlarged bore portions 20c and 40c of the locator section 15c and the main section 14c.

The seal means of the coupling are held in compressed sealing engagement with the pipes and elements of the coupling by the bolts.

If desired, the main section 14c may be provided with a transverse threaded bore 60 in which a conduit or pipe 61 may be threaded. The pipe 61 may be used to permit flow of fluids from or into the fluids flowing through the pipe and of course may have connected therein any suitable valve or flow control device.

While only the coupling 10c illustrated in FIG. 5, has been shown as being provided with a branch or T conduit 61 secured to the main section, it will be apparent that the couplings 10 and 10a can be provided with such branch conduits which preferably would be connected in suitable bores of the locator sections 15 or 15a so that the inner ends of such bores would not be obstructed by a pipe 11 as could occur to the bore 60 if the pipe 11 extends therepast.

It will now be seen that a new and improved coupling has been illustrated and described which is easily installable on spaced ends of longitudinally aligned pipes where the spacing between the pipe ends may vary over a fairly wide range and without the necessity of physical displacement of either of the pipes or the necessity of threading or otherwise working or forming the ends of the pipes.

The foregoing description of the invention is explanatory only and changes in the details of the construction of the illustrated devices may be made by those skilled in the art, within the scope of the appended claims, without departing from the spirit of the invention.

What is claimed and desired to be secured by Letters Patent is:

1. A coupling for connecting adjacent spaced ends of longitudinally aligned pipes, said coupling including: a tubular main section provided with a longitudinal bore having opposite end portions of enlarged diameter, one of said enlarged portions adapted to receive one of the pipes, said bore having an intermediate portion slightly greater in diameter than the external diameter of the pipes, said intermediate portion being of less length than the spacing between the pipes which are to be connected by the coupling; a tubular locator section having an intermediate portion positionable in one of the enlarged portions of the bore of said main section and an inner reduced end portion telescopical in the intermediate portion of the bore of said main section; seal means on said inner reduced end portion engageable with said sections for sealing therebetween; means for holding said sections in telescoped relation and holding said seal means under compression said locator section is provided with a longitudinal bore having an enlarged outer end portion telescopical on the other of said pipes; seal ring means positionable on said pipes; compressor and retainer members movable on said pipes for holding said seal ring means in sealing and retaining engagement with the pipes and said coupling sections; and means for securing said compressor and retainer members to said coupling sections.

2. The coupling of claim 1, wehrein said locator section is provided with an internal annular shoulder engageable with the end of the other of the pipes for limiting telescopical movement of said locator section on the other of the pipes.

3. The coupling of claim 1, wherein said main section at the opposite ends of said intermediate portion of said bore is provided with annular outwardly divergent oppositely facing seal surfaces said, seal means and one of said seal ring means being engageable with said seal surfaces.

4. A coupling for connecting spaced ends of longitudinally aligned pipes, said coupling including: a tubular main section provided with a longitudinal bore having opposite end portions of enlarged diameter, said bore having an intermediate portion slightly greater in diameter than the external diameter of the pipes which are to be connected by said coupling, said main section having outwardly divergent annular surfaces at opposite ends of said intermediate portion of the bore, said main section being telescopical throughout its length on one of the pipes; a tubular locator section having an intermediate portion positionable in one of the enlarged portions of the bore of said main section and an inner reduced end portion telescopical in the intermediate portion of the bore of said main section, said locator section having an annular bevelled seal surface in convergently outwardly extending relation to an adjacent one of the facing seat surfaces of said main section; seal means disposed on said inner end portion and in compressed sealing relation with said facing seal surfaces, said locator section being provided with a longitudinal bore having an enlarged outer end portion and an annular bevelled seal surface extending radially and longitudinally outwardly at the inner end of said enlarged outer end portion; first and second compressor and retainer members telescopical over the pipes and having inner ends provided with seal surfaces; seal ring means positionable on the pipes and engageable with the seal surfaces of the locator section, the main section and the compressor and retainer members; and means for securing said compressor and retainer members to said coupling sections.

5. The coupling of claim 4, wherein said longitudinal bore of said locator section has an intermediate portion of slightly greater diameter than the external diameter of a pipe and an annular stop shoulder at the inner end of said intermediate portion for limiting telescopical movement of the locator section on the end of a pipe.

6. The coupling of claim 6, wherein said enlarged portions of the bore of said main section are internally threaded and said intermediate portion of said locator section is externally threaded whereby said sections are connectible.

* * * * *